United States Patent
Gangadhar et al.

(10) Patent No.: US 10,853,334 B2
(45) Date of Patent: Dec. 1, 2020

(54) TECHNOLOGIES FOR PROVIDING SERVICE ISOLATION, SCALABILITY, AND PROACTIVE TENANT MIGRATION IN MULTI-TENANT ECOSYSTEMS

(71) Applicant: salesforce.com, inc., San Francisco, CA (US)

(72) Inventors: Mahanthi Gangadhar, San Francisco, CA (US); Vijaya Saradhi Pula, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 276 days.

(21) Appl. No.: 15/910,899

(22) Filed: Mar. 2, 2018

(65) Prior Publication Data
US 2019/0272331 A1    Sep. 5, 2019

(51) Int. Cl.
*G06F 16/21* (2019.01)
*H04L 29/08* (2006.01)
*G06F 16/27* (2019.01)

(52) U.S. Cl.
CPC ............ *G06F 16/214* (2019.01); *G06F 16/27* (2019.01); *H04L 67/1008* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |

(Continued)

*Primary Examiner* — Kim T Nguyen
(74) *Attorney, Agent, or Firm* — Schwabe Williamson & Wyatt

(57) ABSTRACT

Systems, methods, and computer-readable media for performance monitoring and tenant migration in multi-tenant and/or cloud computing ecosystems are described. Embodiments may include technologies for scaling multi-tenant systems based on input load characteristics, proactive monitoring and tenant migration in multi-tenant environments, and service isolation in a multi-tenant environments. Other embodiments may be described and/or claimed.

20 Claims, 8 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherphier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,197 B1 | 6/2006 | Desai |
| 7,069,231 B1 | 6/2006 | Cinarkaya |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,043 B1 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,382,291 B2 * | 8/2019 | Subramani Nadar ........ H04L 41/0654 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Mariow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

| | | |
|---|---|---|
| 2013/0247216 A1 | 9/2013 | Cinarkaya |
| 2014/0359537 A1 | 12/2014 | Jackobson et al. |
| 2015/0106499 A1* | 4/2015 | Venkata Naga Ravi ................... G06Q 30/02 709/224 |
| 2017/0054610 A1* | 2/2017 | Vangala .............. G06F 11/3452 |
| 2018/0278725 A1* | 9/2018 | Thayer ................. G06F 16/252 |
| 2018/0316551 A1* | 11/2018 | Subramani Nadar ....................... H04L 41/5054 |
| 2018/0316552 A1* | 11/2018 | Subramani Nadar ....................... H04L 41/0654 |
| 2019/0123973 A1* | 4/2019 | Jeuk ....................... G06N 20/00 |
| 2019/0171474 A1* | 6/2019 | Malboubi ............ G06F 9/45558 |
| 2019/0173765 A1* | 6/2019 | Bertran ................ G06F 16/254 |
| 2019/0272331 A1* | 9/2019 | Gangadhar ............. H04L 43/16 |

\* cited by examiner

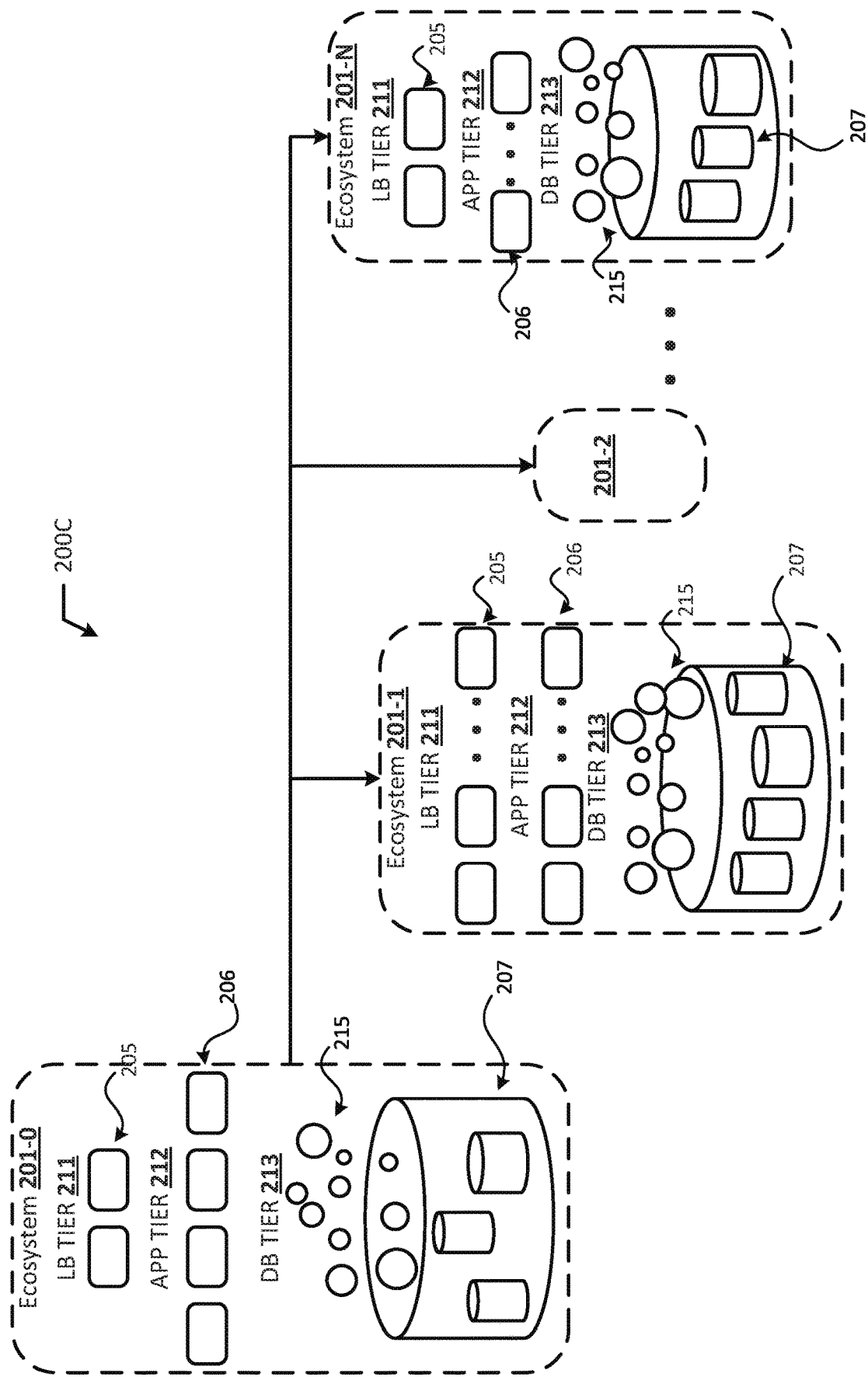

TECHNOLOGIES FOR PROVIDING SERVICE ISOLATION, SCALABILITY, AND PROACTIVE TENANT MIGRATION IN MULTI-TENANT ECOSYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for performance monitoring and tenant migration in multi-tenant and/or cloud computing ecosystems.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. The multi-tenant database systems may include various servers to service requests and provide data to the user/tenants. The various servers and data storage devices of the multi-tenant system may be implemented as a tenant ecosystem or environment that may include multiple tiers or subsystems, which provide different services to the various tenants/orgs.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 2C shows an example arrangement in which various embodiments discussed herein may be practiced.

DETAILED DESCRIPTION

Figure 1A:
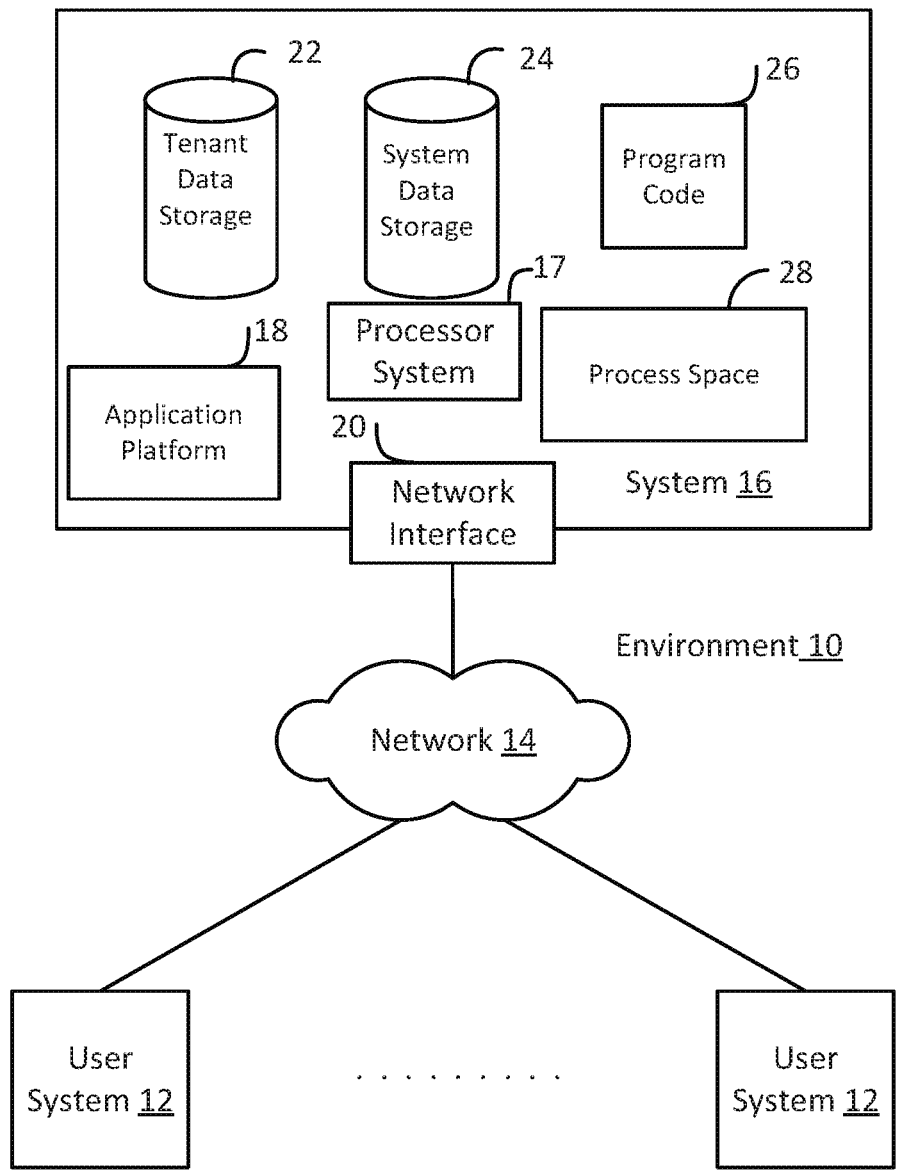
FIG. 1A shows a block diagram of an example environment in which an on-demand database service can be used according to some implementations.

Embodiments discussed herein provide a framework for scaling ecosystems/environments based on input load characteristics, proactive monitoring of tenant migration, and providing service isolation in multi-tenant environments. In embodiments, a set of performance metrics of an ecosystem instance may be identified. The ecosystem instance may comprise a set of service tiers to provide services for tenants of a multi-tenant system. When a trigger for generating one or more ecosystem instances is detected, one or more other ecosystem instances may be generated based on the performance metrics. Each of the one or more other ecosystem instances may include individual sets of service tiers that are isolated from one another and from the service tiers of the ecosystem instance from which the other ecosystem instances were spun off. Additionally, one or more tenants (or tenant instances) may be migrated from the ecosystem instance to another ecosystem instance of the one or more other ecosystem instances, and a set of service tiers of the other ecosystem instance may provide services to the migrated tenants. Other embodiments may be described and/or claimed.

In embodiments, various indicators may be defined for identification of an input load. Different thresholds, such as a low and high warning thresholds, may be defined based on the indicators. If the thresholds are breached (or reached), an auto-scale process may be triggered to scale up or scale down the nodes in a given subsystem/tier. This mechanism may co-exist with the KPI and KCI based auto-scale processes. Auto-scaling of ecosystems based on input load indicators may help proactively avoid service degradation or non-deterministic behavior resulting from KPIs and/or KCIs based auto-scaling approaches.

In embodiments, the auto-scale processes may be triggered when the low warning threshold is reached. New ecosystem instances may be generated when the high warning threshold is reached, and tenants may be proactively migrated out to the new ecosystem instances. In other embodiments, new ecosystem instances may be generated when the low warning threshold is reached, and tenants may be proactively migrated out to the new ecosystem instances when the high warning threshold is reached.

In embodiments, tenant-level parameters that influences the KPIs and KCIs may be monitored and used as a basis for migrating tenants to different ecosystem instances.

In embodiments, tenant sizes may be determined from the tenant-level parameters discussed previously, and various warning thresholds may be defined that, when reached, may re-categorize a given tenant into the proper tenant-size, or cause the tenant to be migrated to a new ecosystem instance. Monitoring tenant-level attributes and re-categorizing tenant into right sized-based-category may help proactive capacity planning and proactive migration without causing (or reduce) service impacts to other tenants. Categorizing tenants based on size attributes and/or resource consumption, and defining thresholds on the maximum number of tenants of a specific size that can reside in an ecosystem may help avoid situations where tenants are reactively migrated to another ecosystem.

In embodiments, individual ecosystem instances may have a maximum number of tenants and an ecosystem size based on available and/or maximum resources. The maximum number of tenants and sizes may be different for different ecosystem instances. Additionally, each ecosystem instance may have different thresholds trigger the auto-scale, ecosystem spin-off, and proactive tenant migration processes discussed previously. Defining a maximum number of tenants per ecosystem and creating additional ecosystems (in separate availability zones) may help isolate tenants into different ecosystems and localize any service degradation/outages. In embodiments, once tenant migration is completed, appropriate configuration changes to the global load balancers may take effect so that traffic for the migrated tenants is redirect to the new ecosystem instance in which a tenant resides.

The various embodiments discussed herein may help avoid scaling-related issues with regard to infrastructure deployments and/or resource allocation. Additionally, embodiments may allow for faster and/or optimal tenant integration, better/optimal handling of tenants whose size increases over time, as well as providing lower operating and support costs. Furthermore, embodiments herein may reduce tenant performance/capacity/availability issues resulting in increased tenant satisfaction and trust.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

As used herein, the terms "resource," "computing resource," "hardware resource," etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. As used herein, the term "network resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application. Moreover, the term "resource" may refer to the particular resource being accessed or an address or other means of accessing the resource.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include HTML, Extensible Markup Language (XML), Java Script Object Notion (JSON), Cascading Stylesheets (CSS), JavaServer Pages (JSP), MessagePack™, Apache® Thrift, Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

Figure 1B:
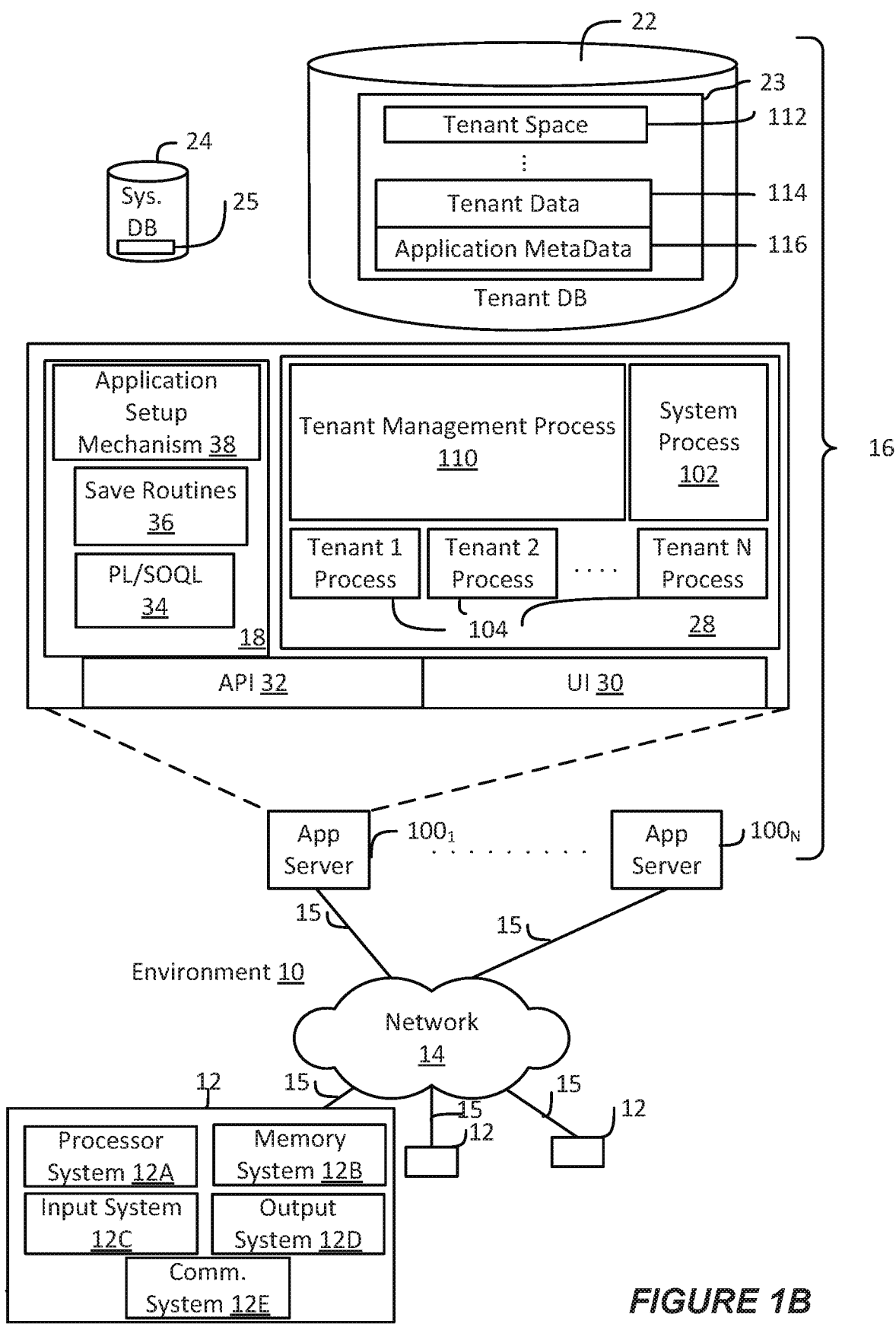
FIG. 1B shows a block diagram of example implementations of elements of FIG. 1A and example interconnections between these elements according to some implementations.

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for and tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various implementations, application platform 18 may be a development environment, programming language, and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Example Implementation

Figure 2A:
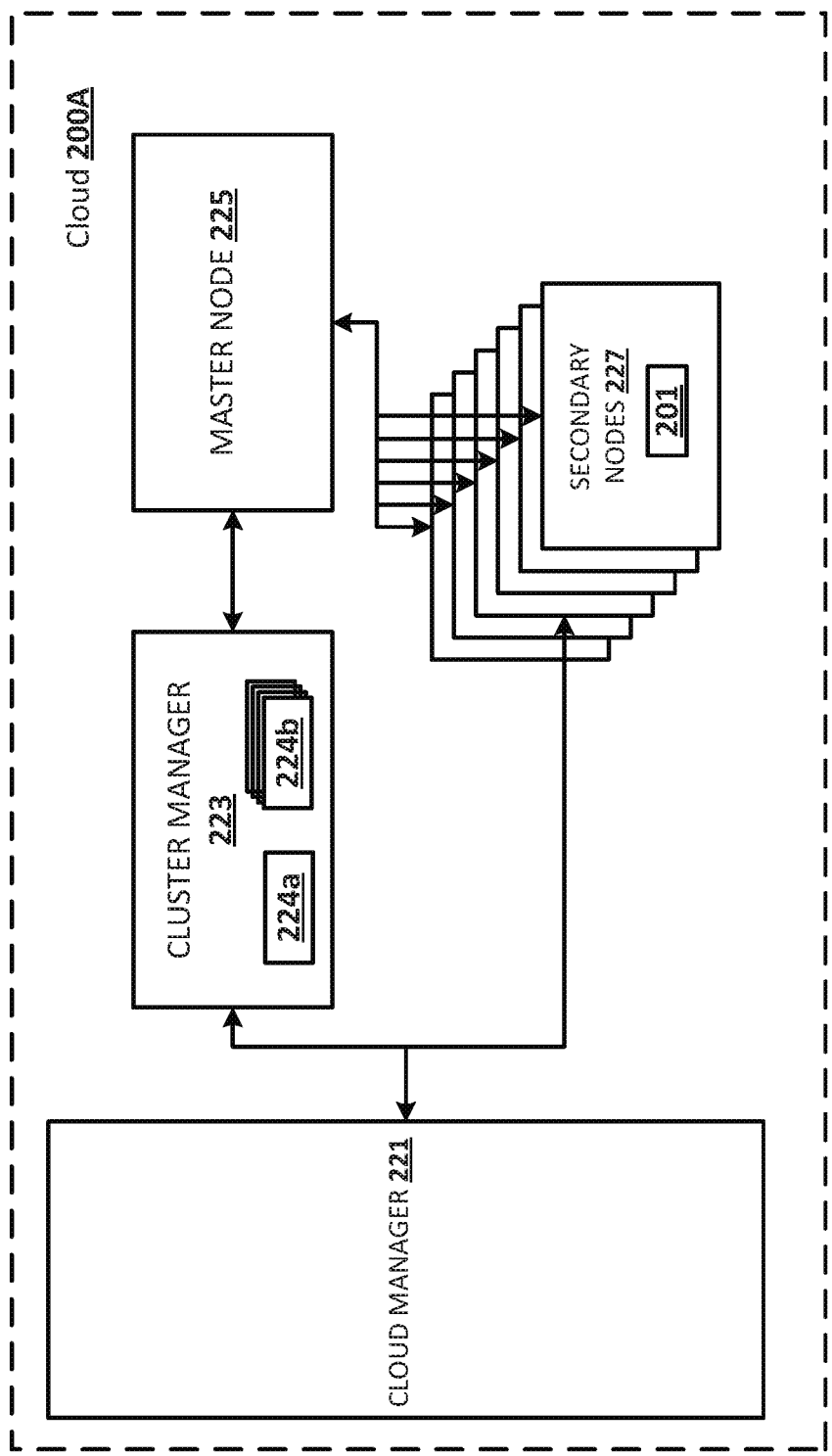
FIG. 2A illustrates the components of the cloud computing service according to some embodiments.

FIG. 2A illustrates the components of the cloud computing service 200A (also referred to as "cloud 200A" or the like) in accordance with various embodiments. In embodiments, the cloud 200A may provide cloud computing ecosystems 201 (also referred to as "ecosystems 201" or "ecosystem instances 201"), which may provide multi-tenant database and/or cloud computing services to a plurality of tenants 215. The term "ecosystem" may refer to a system of components and devices that work together to provide various services, and may also refer to a collection of applications and packages that can be installed and operated on top of or within an ecosystem. In some cases, the term "ecosystem" may also be referred to as an a "multi-tenant environment," "environment," or the like. In various implementations, individual ecosystems 201 may support a discrete subset of tenants. A tenant may move between ecosystems 201 via tenant migration. Ecosystems 201 may be referred to as "instances", and in some implementations, the name or identifier of an ecosystem instance 201 may be part of an address or URL that a tenant may use to access their tenant space within the ecosystem 201. Each ecosystem 201 may implement several hosts, stacks, subsystems, or tiers, where each of these stacks/hosts/subsystems/tiers may have different configurations and workload characteristics or metrics that change over time.

Figure 2B:
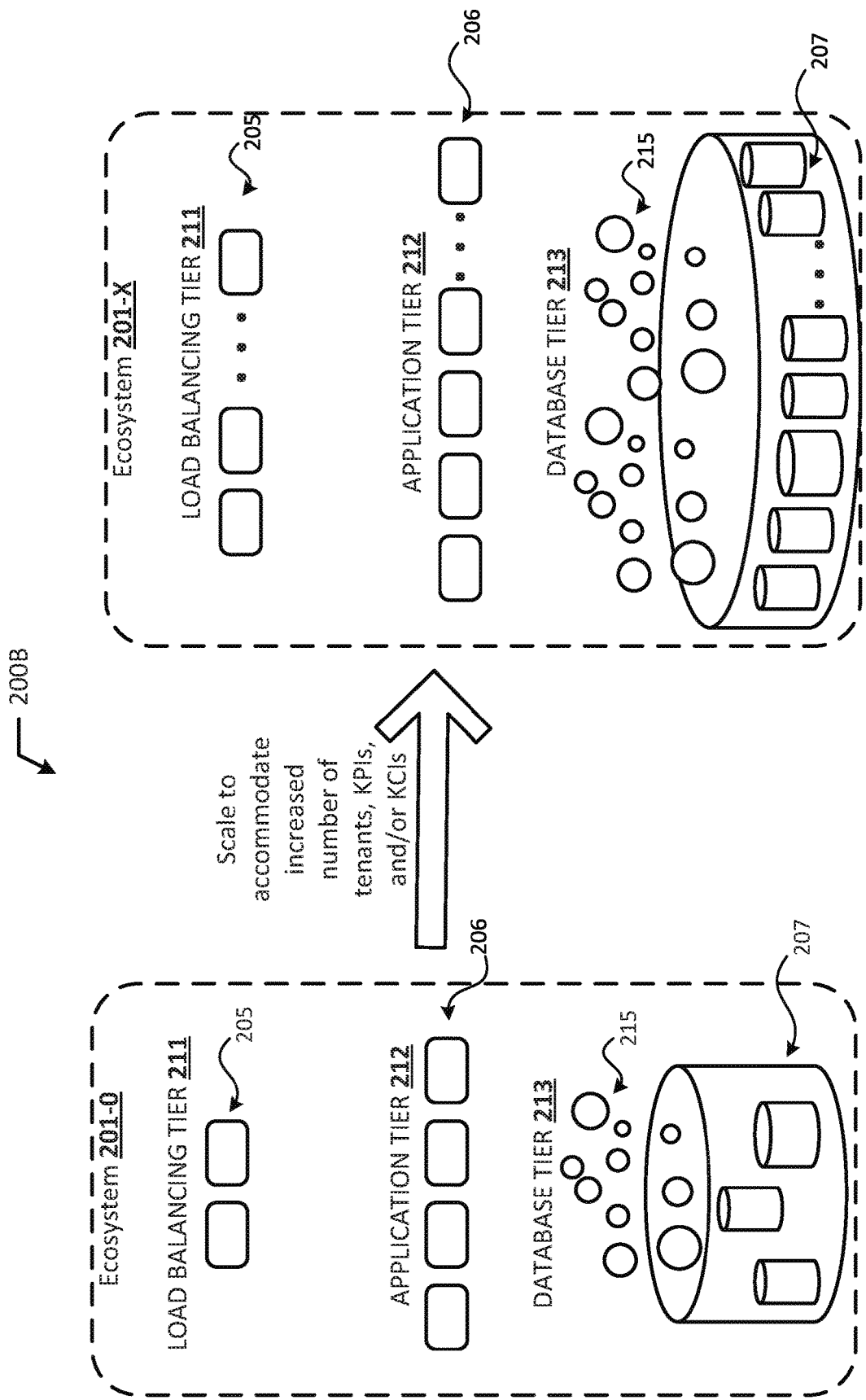
FIG. 2B shows an example arrangement in which various embodiments discussed herein may be practiced.

The cloud computing service 200A may be a system of computer devices (e.g., servers, storage devices, applications, etc., such as those discussed with regard to FIGS. 1A-1B) that provides access to a pool of physical and/or virtual resources (e.g., resources 205, 206, and 207 in FIGS. 2B-2C). The cloud 200A may be a public cloud service, which provides computing resources to the general public and shares computing resources across all customers/users; a private cloud service, which offers cloud services to a single organization; or a hybrid cloud or virtual private cloud service, which uses a portion of resources to provide public cloud services while using other dedicated resources to provide private cloud services. For example, the hybrid cloud service may include a private cloud service that also utilizes one or more public cloud services for certain applications or users. In embodiments, a common cloud management platform (e.g., implemented as various virtual machines and applications hosted across the ecosystem 201) may coordinate the delivery data to user systems 12 and among the various components/devices within the ecosystem 201. In some implementations, the ecosystem 201 may provide an Infrastructure as a Service (IaaS) platform or a Platform as a Service (PaaS) cloud service platform.

The cloud 200A and the various ecosystems 201 discussed herein may be implemented using virtualization infrastructure (not shown by FIGS. 2A-2C). The virtualization infrastructure may comprise various hardware and software components and/or resources that may be used to execute virtual or reconfigurable implementations of one or more ecosystems 201, as well as individual components, subsystems, or tiers deployed, managed and executed within a corresponding ecosystem 201. Each of the tiers and/or ecosystems 201 may be implemented via virtualization and/or containerization. Virtualization may refer to the abstraction of one or more isolated VMs, which are virtual versions of computer hardware platforms, storage devices, and/or network resource(s) that are operated by a virtual machine monitor (VMM) and/or hypervisor on shared computing resources. Each VM may operate one or more applications to perform various functions and/or provide various services to individual tenants 215 and/or users. Containerization (also known as "operating system virtualization") may refer to the abstraction of multiple isolated tenant or user-space instances that may operate their own applications or services, run on a single host, and access a same OS kernel. Each tenant or user-space instance is referred to as a container, which are virtualized and software-defined environments in which software applications can run in isolation of other software running on a physical host machine. In various embodiments, the ecosystems 201 may be implemented as individual VMs, execution/application containers (e.g., Docker™ containers), sandboxes, or the like that run on top of the virtualization infrastructure.

The virtualization infrastructure, such as one or more physical computer and storage devices, that implement/operate individual ecosystems 201 may be referred to as "nodes." An individual node may be a single computing unit or a single unit of computing resources within a cluster, and a "cluster" may be set of compute or computation units. As shown by FIG. 2A, the nodes of the cloud 200A may include cloud manager 221, cluster manager 223, master node 225, and secondary nodes 227. The nodes in the cloud 200A may be connected with one another via a LAN, fast LAN, message passing interface (MPI) implementations, and/or any other suitable networking technology. In addition, various messages may be conveyed between the various entities in the cloud 200A using a Representational State Transfer (REST or RESTful) API, Simple Object Access Protocol (SOAP) API, Apex API, and/or some other like API or mechanism as discussed herein, and such messages may be in any suitable format, such as HTML, XML, JSON, and/or some other suitable format and variants thereof, such as those discussed herein.

In this example implementation, the secondary nodes 227 may operate the ecosystems 201. The virtualization infrastructure may span across several nodes The various nodes may be within or associated with a data center or data warehouse, or may distributed across multiple data centers/warehouses at various geographic locations.

The virtualization infrastructure may span across several nodes, one or more of which may be located at one or multiple geographic locations. A network or network connections providing connectivity between the various nodes may also be part of the virtualization infrastructure. The physical hardware resources of the virtualization infrastructure may include computing, storage and network resources that provide processing, storage, and connectivity to tenant spaces 112, tenant data 113, application platforms 18, etc. through a virtualization layer (not shown by FIGS. 2A-2C), which may include, for example, type 1 or type 2 hypervisors, virtual machine monitor (VMM), or the like. The virtualization layer may abstract and/or logically partition the physical hardware resources of the virtualization infrastructure as a hardware abstraction layer. The virtualization layer may also enable the tenant applications and platforms to use the underlying virtualization infrastructure, and may provide virtualized resources to these applications/platforms, so that these applications/platforms can be executed, In addition, the virtualization infrastructure may comprise a virtualization infrastructure manager (VIM). The VIM may manage the life cycle of virtual resources (e.g., creation, maintenance, and tear down of VMs associated with one or more physical resources), track VM instances, track performance, fault and security of VM instances and associated physical resources, and expose VM instances and associated physical resources to other management systems Referring back to FIG. 2A, the cloud manager 221 (also referred to as a "cloud management system 221," "cloud management platform 221," and the like) may be one or more computer devices (e.g., servers, virtual machines, physical or logical storage devices, physical or logical network interfaces, etc.) configured to manage use and operation of the cloud 200A (e.g., physical or logical servers, physical or logical storage devices, physical or logical network interfaces utilized by the cloud 200A). Each of the one or more computer devices may include a processor system, memory systems, input systems, output systems, interface/communications systems, and/or other like components. Management of the use and operations of the cloud 200A may include managing computing resources and allocation of the computing resources, providing access to end users (e.g., database system 16, tenants 215, user systems 12, etc.), monitoring and implementing security applications, system failure monitoring and recovery (e.g., self-healing), and/or other like operations. In embodiments, the cloud manager 221 may forward various messages between various elements (nodes) in the cloud 200A, and external entities (e.g., database system 16, user systems 12, etc.).

The cluster manager 223 (also referred to as a "dynamic cluster manager 223" and the like) may be one or more computer devices (e.g., servers, virtual machines within a computer device, physical or logical storage devices, physical or logical network interfaces, etc.) configured to schedule tasks, create and/or terminate nodes (e.g., master node 225 and secondary nodes 227), perform node failure management procedures, schedule computing resources for the various nodes, and/or other like cluster management functions. Each of the one or more computer devices may include a processor system, memory systems, input systems, output systems, interface/communications systems, and/or other like components. The cluster manager 223 may act as a centralized manager for the clusters in the cloud 200A (e.g., master node 225 and secondary nodes 227) by implementing a cluster management OS 224a (also referred to as "kernel 224a" and the like) for one or more distributed applications and/or frameworks 224b. The OS 224a may be an OS that is specifically built to allow cluster manager 223 to perform the cluster management functions discussed previously. The OS 224a may provide and interface for frameworks 224b to access to computing resources in or at particular cluster(s). Each of the frameworks 224b may be an environment that provides particular functionality as part of a larger platform to facilitate development of various applications.

In embodiments, each framework 224b may be used to for a particular function, or may be used to build and implement various applications to perform such functions. In embodiments, a first framework 224b may be used to build applications for performing various application server tasks (e.g., generating and sending messages, receiving and processing responses, etc.). In embodiments, a second framework 224b may be used to build and implement applications for monitoring resources and input load characteristics, and for determining whether various warning thresholds have been reached. For example, the input load and threshold monitoring service may be built and implemented using a monitoring and alerting platform, such as Salesforce® *Argus* and/or the like. In embodiments, a third framework 224b may be used to build and implement applications for scaling up or scaling down ecosystems 201. For example, the scaling service may be built or implemented using a cluster management platform, resource negotiator(s), job schedulers, etc., such as Apache® Mesos™, Apache® Hadoop™, and/or the like. In embodiments, a fourth framework 224b may be used to build and implement applications for spinning-off or otherwise generating new ecosystems 201 (and/or new secondary nodes 227 and/or clusters). For example, the spin-off service may be one or more applications that instruct a hypervisor or virtual machine manager (VMM) to create one or more new ecosystems 201 using a base image or the like. In another example, the spin-off service may be custom application that builds ecosystems 201 using any system virtualization implementations (e.g., Kernel-based Virtual Machine (KVM), Oracle® VM, VMware® ESX/ESXI, etc.), or builds service/process/application/OS virtualization or containerization implementations, such as Java™ Virtual Machine (JVM), Android Runtime (ART), Common Language Runtime (CLR), Docker®, Virtuozzo or OpenVZ, and/or the like. In another example, the spin-off service may additionally or alternatively be built and implemented using a deployment, provisioning platform, or continuous integration platform, such as Jenkins, Chef® Automate, Puppet® Enterprise or Pipelines, or the like.

In embodiments, a fifth framework 224b may be used to build applications for migrating one or more tenants 215 to newly generated ecosystems 201. For example, the migration service may be built and implemented using a deployment, provisioning platform, or continuous integration platform, such as Jenkins, Chef® Automate, Puppet® Enterprise or Pipelines, or the like.

Each framework 224b may include a scheduler (not shown) that may schedule tasks/jobs (not shown) for various secondary nodes 227 to execute. Each framework 224b may register with the master node 225 so that the master node 225 may offer secondary node 227 resources to each framework 224b for execution of the tasks/jobs. In embodiments, the OS 224a may be an Apache® Mesos™ cluster manager. In such embodiments, the frameworks 224b may be Apache® Hadoop™, Apache® Aurora™, Apache® Chronos™ Apache® Marathon™, Apache® Spark™, WildFly™ provided by Red Hat, Inc., Memecached, MPI, and Node.js, Ruby on Rails, and/or the like. In addition, the cluster manager 223 may implement one or more of the same type of framework 224b (e.g., a plurality of Apache® Hadoop™ frameworks, etc.) and/or one or more different frameworks 224b (e.g., one or more Apache® Hadoop™ frameworks and one or more MPI frameworks).

The master node 225 may be one or more computer devices (e.g., servers, virtual machines within a computer device, physical or logical storage devices, physical or logical network interfaces, etc.) configured to manage the secondary nodes 227 (also referred to as "agent nodes 227", "slave nodes 227"). Each of the one or more computer devices may include a processor system, memory systems, input systems, output systems, interface/communications systems, and/or other like components. In some embodiments, the master node 225 may be referred to as a "manager node," and in other embodiments, a combination of the cluster manager 223 and the master node 225 may be referred to as a "manager node."

Management of the secondary nodes 227 may include implementing an allocation module to obtain an indication of available resources from each secondary node 227, and to provide resource offers to the frameworks 224b. In some embodiments, the master node 225 may aggregate all reported available resources across all secondary nodes 227, and may offer them to all registered frameworks 224b. In embodiments, the master node 225 may determine how many resources to offer each framework 224b, and each framework 224b may accept or reject resource offers from the master node 225 based on the requirements of particular applications using that framework 224b. Each resource offer may comprise an agent identifier (ID), one or more resource IDs and a resource amount corresponding to each resource ID, which in some embodiments, may be denoted as <agent ID: agent1, resource1: amount1, resource2: amount2, agent ID: agent 2, resource1: amount1, resource2: amount2, . . . >. In addition, the frameworks 224b may decide which tasks/jobs to be executed on the offered resources. The resource offers may be provided according to a policy, or according to a sharing scheme, such as fair sharing, strict priority sharing, etc. After the master node 225 provides the resource offer to the frameworks 224b, the master node 225 may obtain an indication of one or more tasks to be executed using selected resources, and the master node 225 may provide the one or more tasks to the secondary nodes 227 that have the selected resources. The master node 225 may also provide instructions to execute the one or more tasks using the selected resources.

Each of the secondary nodes 227 (also referred to as "agent nodes 227", "slave nodes 227", etc.) may be one or more computer devices (e.g., servers, virtual machines within a computer device, physical or logical storage devices, physical or logical network interfaces, etc.) configured to execute tasks/jobs scheduled by the frameworks 224b. Each of the secondary nodes 227 may have their own dedicated physical or virtual processor system, memory system, input systems, output systems, interface/communications systems etc., and may determine available computing resources at a given time. Each secondary node 227 may then provide an indication of the available resources to the master node 225 in a same or similar manner a discussed previously with regard to the resource offer (e.g., <agent ID, resource1: amount1, resource2: amount2, >).

Additionally, the secondary nodes 227 may obtain, from the master node 225, an indication of one or more tasks to be executed on the available resources with an instruction to execute particular tasks using particular ones of the available resources. Each of the secondary nodes 227 may implement an execution container 227 to execute one or more tasks provided by a corresponding one of the frameworks 224b (e.g., a first execution container 227 may correspond to a first framework 224b, a second execution container 227 may correspond to a second framework 224b, and so forth). In this way, each secondary node 227 may execute tasks for multiple frameworks 224b side-by-side and/or in parallel (including the aforementioned applications for practicing the various embodiments herein). The secondary nodes 227 may also send results of the task execution back to the master node 225, and also provide indications of current workloads and/or resource utilizations.

Although FIG. 2A shows a secondary node 227 that implemented an ecosystem 201, in various embodiments, an ecosystem 201 may be made up (or operated by) a variety of secondary nodes 227. In addition, various secondary nodes 227 may be grouped into different subsystems of an ecosystem 201. The different subsystems may be arranged as multiple tiers, where each tier in an ecosystem 201 may process an aspect of the overall processing used to provide a particular service to tenants 215. A multi-tenant system comprising multiple tiers may be referred to as a "multi-tier" system. Examples of these subsystems and tiers is shown by FIGS. 2B and 2C.

III. Ecosystem Scaling, Ecosystem Spinoff, and Tenant Migration

FIGS. 2B and 2C show example arrangements 200B and 200C, respectively, in which various embodiments discussed herein may be practiced. As shown by FIGS. 2B-C, the ecosystems 201 may include a load balancing (LB) tier 211, an application (app) tier 212, and a database (DB) tier 212; however, in other implementations, there may be many more or fewer tiers than are shown, such as storage tiers, search tiers, and the like. In these examples, load balancing tier 211 may comprise load balancing resources 205, the application tier 212 may comprises application resources 206, and database tier 213 may comprise database resources 207 that are allocated to a plurality of tenants 215. Each circle in FIGS. 2B and 2C may represent an individual tenant 215.

As mentioned previously, each ecosystem 201 may be made up of a wide variety of nodes grouped into different subsystems or tiers 211-213, where each subsystem or tier 211-213 may process a specific aspect of the overall processing that needs to be done to provide one or more services that the ecosystem 201 is to provide. The different tiers 211-213 may be allocated individual resources within an ecosystem 201. For example, as shown by FIG. 2B, the LB tier 211 may be allocated LB resources 205, which may be used to for execution of various load balancing, load distribution, overload control, and/or other resource management functions; the app tier 212 may be allocated various app resources 206, which may be used for execution of various tenant applications; and the DB tier 213 may be allocated various DB resources 207, which may be used for performing various DB access and manipulation functions.

For multi-tenant systems, a unique key may be used to identify each tenant 215 in the ecosystem 201. Each tier 211-213 can be configured to be elastic, such that the ecosystem 201 may grow or shrink the resources allocated to a particular subsystem or tier 211-213 based on key performance indicators (KPIs) and/or Key Capacity Indicators (KCIs) of the nodes in a given subsystem or tier. In this regard, the term "elasticity" may refer to an ecosystem capability to dynamically change resource allocation based on scalability. The term "scalability" may refer to an ecosystem capability to continue to provide service availability in spite of increase or decrease in tenants and/or load, resource consumption, etc. Additionally, the term "service availability" may be a measure of a service being available in a deterministic manner.

As more tenants 215 are added to an ecosystem 201, and/or as the use of various resources 205-207 increases (e.g., based on various KPIs and/o KCIs), an ecosystem 201 (e.g., ecosystem instance 201-0 in arrangement 300B of FIG. 2B) may be scaled up to increase the amount of resources 205-207 per tier. For example, as shown by FIG. 2B, the scaled up version of ecosystem 201 (e.g., ecosystem instance 201-X in arrangement 300B of FIG. 2B) has increased in size to reflect the increase in the number of tenants 215 and the increase in allocated and/or used resources 205-207. Additionally, in FIGS. 2B-2C, the sizes of the circles that represent individual tenants 215 may represent a relative size of each tenant 215.

However, in these cases, since all tenants 215 are located in a single ecosystem 201, the tenants 215 may be exposed to service degradation or outage due to unplanned service interruption issues and/or planned service interruptions. Examples of unplanned service interruption issues may include site failures, underlying hardware failures, code bugs, human errors, and the like. Examples of planned service interruptions may include activities such as upgrades, patches, maintenance, hardware remediation or replacements, and the like. Additionally, some of the shared subsystems/tiers may not scale linearly, which means that as one or more tenants 215 increase in size, complexity, and load may result in either non-deterministic behavior or degraded service for other tenants 215. Furthermore, when the ecosystem 201 is scaled based on KPIs and/or KCIs, the ecosystem 201 may be slow to adapt to system load characteristics since the KPIs and/or KCIs typically have to indicate poor system performance before the scaling or other resource usage changes take place. According to various embodiments, ecosystem 201 scaling and spin-off may be based on input load characteristics, an example of which is shown by FIG. 2B.

In FIG. 2B, an ecosystem 201 may be split into multiple ecosystem instances based on different input load characteristics. For example, in arrangement 300B of FIG. 2B, an ecosystem instance 201-0 may be spun off into ecosystem instances 201-1 to 201-N, where N is a number. In addition, the ecosystem instance 201-0 may be proactively monitored to determine if the input load characteristics have reached one or more thresholds or are likely to be reached, and one or more tenant spaces may be migrated to one of the new ecosystem instances 201-1-201-N.

Furthermore, the various ecosystem instances 201 may provide service isolation among the individual tenants 215 so that changes to one tenant is less likely to affect the performance of other tenants. The term "service isolation" may refer to various mechanisms used to ensuring service unavailability of a particular ecosystem 201 and/or particular hardware resources does not impact all tenants 215. This is because, as discussed previously, the ecosystem instances 201 may be implemented through virtualization or containerization. In the context of cloud computing services, any workload provided by individual tenants 215 or associated user systems 12 may run in isolation from any other workloads running on the physical infrastructure and/or any other workloads running in other ecosystem instances 201 including one or more other tenants 215. Using service isolation provided through virtualization or containerization, may eliminate or reduce the impact on various tenants 215 in a first ecosystem 201 from other workloads provided by other tenant(s) 215 in a second ecosystem 215 that may cause overload scenarios, errors, failures, or the like. In addition, service isolation may allow tenants 215 to be migrated out of an overloaded or failing ecosystem 201 into other ecosystems 201 so that those tenants 215 may continue to obtain services while the cloud service provider fix or shut down the overloaded or failed ecosystem 201.

IV. Example Procedures

FIGS. 3-6 illustrate various processes for practicing the example embodiments discussed herein. For illustrative purposes, the operations of the processes of FIGS. 3-6 are described as being performed by elements/components/devices shown and described with regard to FIGS. 1A-2C; however, other computing devices/systems may operate the depicted processes in a multitude of implementations, arrangements, and/or environments. In various implementations, the processes may be embodied as program code stored in a memory system, which when executed by a processing device or a processor system of a computer device/system, may cause the computer device/system to perform the various operations of such processes. In such implementations, one or more general purpose processing device(s) may be transformed into a special purpose processing device(s) configured to perform any of operations described herein responsive to accessing the program code of processes 300A-500 of FIGS. 3-6, respectively, from an electronic memory or computer-readable media. While particular examples and orders of operations are illustrated in FIGS. 3-6, in various embodiments, these operations may be re-ordered, separated into additional operations, combined, or omitted altogether.

Figure 3A:
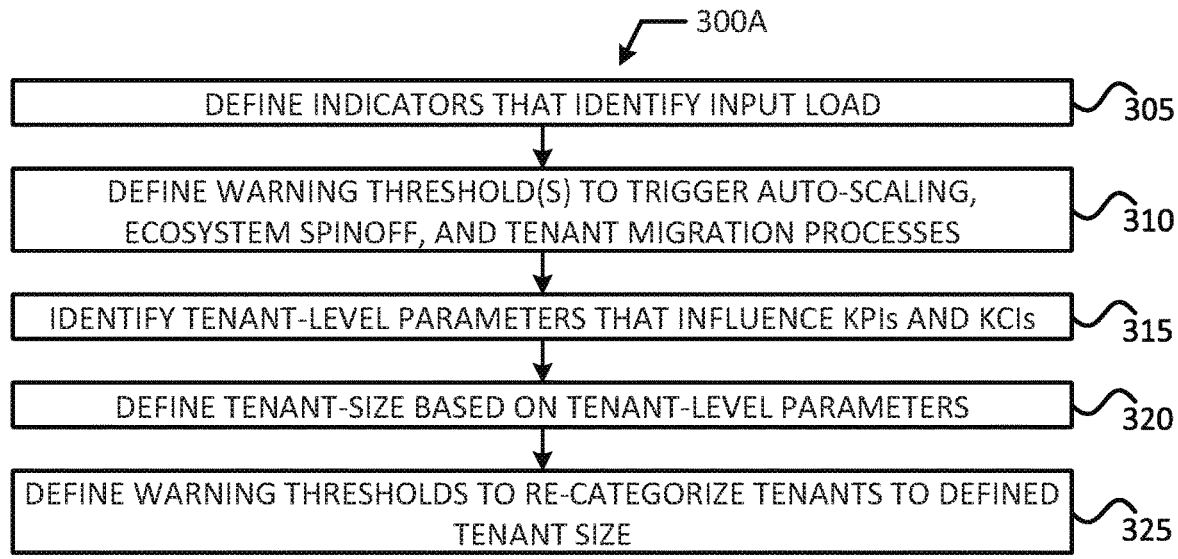
FIG. 3A shows an example auto-scaling configuration process, in accordance with various embodiments.

FIG. 3A illustrates an example auto-scaling configuration process 300A, in accordance with various embodiments. Process 300A may be used to create a configuration to define when an ecosystem 201 should be scaled up or down based on various input load characteristics. This configuration may be by an entity, such as a database object or other like data structure, that encapsulates information used by the cloud 200A (or a management node within the cloud 200A) to perform the auto-scaling process for ecosystem instances 201. This configuration may be a collection or set of auto-scaling parameters (or "components") each of which comprises an auto-scaling parameter value against which various metrics are checked. The configuration may be in any suitable format, such as HTML, XML, JSON, or some other suitable format. Additionally, a GUI may be built to allow the owner/operator/developers of a multi-tenant system to define the configuration.

Process 300A may begin at operation 305 where processing device(s) of a manager node may define indicators that are used to identify an input load of an ecosystem 201. The input load indicators may be used to scale-up or scale-down an ecosystem 201 based on input load characteristics. The input load may be a measure of work or a workload submitted to a particular ecosystem instance 201 or an individual tier within an ecosystem instance 201 for processing.

The term "work" may refer to a discrete unit of data calculation, and in some implementations, the discrete unit of data calculation may be based on a cost to perform the discrete unit of work, where the term "cost" may refer to an amount of resources utilized to accomplish one unit of work. The term "workload" may refer to an amount of work performed by an entity during a period of time or at a particular instant of time. A workload may be represented as a memory workload (e.g., an amount of memory space needed for program execution to store temporary or permanent data and to perform intermediate computations), processor workload (e.g., a number of instructions being executed by a processor system/device during a given period of time or at a particular time instant), I/O workload (e.g., a number of inputs and outputs or system accesses during a given period of time or at a particular time instant), database workloads (e.g., a number of database queries during a period of time), a network-related workload (e.g., a number of network attachments, a number of user authentications, an amount of data to be transferred over a communications link, etc.), and/or the like. Various algorithms may be used to determine a workload and/or workload characteristics, which may be based on any of the aforementioned workload types. Furthermore, various weighting or ranking algorithms may be used to emphasis or prioritize on different types of workloads over other types of workloads. As used herein, the term "workload" may refer to any of the aforementioned workload types or combinations thereof.

In some embodiments, the input load may also use tenant size, or resource consumption per tenant 215, into account for determining an input load. In some embodiments, KPIs, KCIs, and other metrics may also be considered for determining the input load. Examples of KPIs may include response time, latency, throughput, jitter, etc., and/or examples of KCIs may include, inter alia, resource utilization or the like. The other metrics may include, inter alia, output power or power consumption changes for various pods or nodes, code regressions due to software releases, deviations (e.g., increases or decreases) in workload from the customer or system perspectives, deviation (e.g., increases or decreases) in customer transaction demands, a number of negative incidents (e.g., failures, overloads, etc.), etc.

At operation 310, the processing device(s) of the manager node may define warning threshold(s) to trigger auto-scaling, ecosystem spinoff, and/or tenant migration processes. The warning threshold(s) may be defined in terms of the input load characteristics discussed previously and/or other ecosystem-specific parameters. In some embodiments, a single threshold may be defined, which when reached, may trigger execution of a spin-off procedure to generate one or more new ecosystems 201. This mechanism may operate in a same or similar manner as discussed with regard to FIG. 2B, and this mechanism may co-exist with existing KPI and KCI based scaling processes discussed previously. In some embodiments, multiple thresholds may be defined for triggering auto-scaling, spinning off new ecosystems 201, and migrating tenants 215 to different ecosystems 201.

In other embodiments, a low warning threshold and a high warning threshold may be defined. In these embodiments, when the low warning threshold is reached, the processing device(s) may trigger an auto-scaling process to scale up or scale down a particular ecosystem instance 201 and/or individual nodes or resources in a given tier. Additionally, when the high warning threshold is reached, the processing device(s) may trigger a spin-off procedure for generating one or more new ecosystem instances 201. Additionally, once the new ecosystem instances 201 have been generated, one or more selected tenants 215 may be proactively migrated to the newly generated ecosystem instances 201. In some embodiments, the low warning threshold may be a lower input load value than an input load value of the high warning threshold (e.g., low warning threshold <high warning threshold). Additionally, different thresholds may be defined for different ecosystem instances 201 based on their input load characteristics and/or ecosystem parameters.

In a second example, the low and high thresholds may be used to spin-off new ecosystem instances 215 and to migrate tenants 215. In this example, new ecosystem instances 215 may be generated or spun off when the low warning threshold is reached, and one or more tenants 215 may be proactively migrated out to the new ecosystem instances 215 when the high warning threshold is reached.

In a third example, low, medium, and high warning thresholds may be defined. In this example, where warning thresholds may be defined where the auto-scale process may be triggered when a low warning threshold is reached, a new ecosystem instance 201 may be generated when a medium warning threshold is reached, and one or more tenants 215 may be migrated out to the new ecosystem instances 215 when a high warning threshold is reached. Tenant-level parameters that influences the input load, KPIs, and KCIs may also be monitored and used as a basis for migrating tenants to different ecosystem instances.

At operation 315, the processing device(s) of the manager node may identify and/or define tenant-level parameters that influence KPIs and KCIs. As mentioned previously, KPIs may include metrics such as response time, latency, throughput, jitter, etc., and/or KCIs may include metrics such as resource utilization or the like. In various embodiments, various metrics may be monitored and collected to determine their individual effect on the KPIs and KCIs. In addition, the metrics may be monitored/collected to determine their individual effect on the KPIs and KCIs on individual tiers. The compiling/aggregation of the metrics may be conducted on a periodic basis or based on various trigger events.

Examples of the metric types to be measured may include component level metrics, system level metrics, and/or business level metrics. Component level metrics may include measurements of hardware resources of one or more nodes that implement individual tiers, such as database tier (db_tier) measurements, application tier (app_tier) measurements, and load balancing tier (lb_tier) measurements, and the like. The db_tier metrics may include measurements such as DB size(s), DB processor/processing utilization or overall DB processor resource consumption, DB time (an elapsed processing time accumulated from elapsed times of non-idle sessions), DB processor time (e.g., an amount of time that the processor systems of the DB system 16 spend on DB user-level calls (in microseconds)), DB processor time ratio (e.g., DB processor time divided by the db time), DB processor non-idle wait times, DB processor power usage or consumption, storage area network (SAN) input/output (IO) measurements, and/or the like. The SAN IO metrics may include measurements such as, an amount of read and/or write operations that can be achieved per unit of time (e.g., IO operations per second (IOPS)), a size of each IO request, based on how much throughput data storage devices can deliver (e.g., average IO size multiplied by IOPS, which may be expressed in megabytes per second (MB/s)), IO response times and/or IO latency times, IO queue sizes. The SAN IO measurements may be taken of physical and/or virtual storage systems. The app_tier metrics may include measurements such as application processor (e.g., for particular app server 100 processor system components) usage or utilization, application processor idle time, host system memory usage, application processor time, application processor time ratio, application processor non-idle wait times, application processor power usage or consumption, etc. The lb_tiermetrics may include measurements such as load balancer processor usage or utilization (e.g., for particular load balancers 228), load balancer processor idle time, load balancer memory usage, load balancer processor time, load balancer processor time ratio, load balancer processor non-idle wait times, load balancer processor power usage or consumption, etc. The system level metrics may include measurements of system accesses, such as average page time (APT), number of transactions, number or user requests, average size or user requests, average size of DB queries, number of user responses, average response time, number of requests to access individual resources or tenant data, and the like. The business level metrics may include measurements such as a number of incidents (failures, errors, etc.); a number of active tenants 215 per node or ecosystem 201; and/or the like.

In embodiments, the processing device(s) of the manager node may identify the tenant-level parameters based on a correlation of the monitored metrics/measurements of individual ecosystem instances 201 and/or individual tiers with various performance service level agreement (SLA) metrics, KPIs, KCIs, or some other baseline metrics or thresholds. Based on the correlation(s), the processing device(s) may identify one or more monitored metrics that drive or otherwise impact performance and/or user/customer experience at individual tiers. The correlation mechanisms used by the processing device(s) may include a suitable regression analysis such as quantile regression, a time-series analysis such as Autoregressive-Moving-Average (ARMA) modeling, Box-cox transformation ARMA residuals Trend and Seasonality (BATS) modeling, Trigonometric BATS (TBATS) modeling, and/or the like. Using such correlation mechanisms, the processing device(s) may detect anomalies and trends in the metrics, which may be used for identifying/determining whether the various warning thresholds have been reached or breached. Other methods or mechanisms may be used in other embodiments.

At operation 320, the processing device(s) of the manager node may define a maximum tenant-size based on the tenant-level parameters. In embodiments, an ecosystem 201 may include one or more tenants 215, however, an individual tenant 215 may only exist in one ecosystem 201. An individual tenant 215 may only move between ecosystems 201 via an tenant or ecosystem migration. Tenant migration typically occurs when overload scenarios occur, or may take place for load balancing purposes. In order to avoid overload scenarios, a maximum tenant size may be defined in order to limit how large an ecosystem 201 may be enlarged. In embodiments, the maximum tenant size may be defined according to the various tenant-level parameters or metrics discussed previously. For example, the maximum tenant size for an ecosystem 201 may be defined in terms of a maximum amount of db_tier, app_tier, and/or lb_tier resources being consumed by a particular tenant 215. The tenant sizes of different tenants 215 may be different from one another. For example, a first tenant 215 may be allocated a first amount of resources based on a first subscription or data plan, and a second tenant 215 may be allocated a second amount of resources based on a second subscription or data plan. In this example, the amount of resources allocated to a tenant 215 may dictate the tenant size for that tenant 215. At operation 325, the processing device(s) of the manager node may define warning thresholds to re-categorize tenants to the defined tenant size. When these warning thresholds are reached, the processing device(s) may re-categorize or scale a given tenant 215 to the defined tenant size, or cause the tenant to be migrated to a new ecosystem instance 201.

The proactive tenant monitoring and migration configuration process 300B may be used to create a configuration to define when ecosystem instances 201 should be spun-off and/or when tenants 215 should be migrated to the newly spun-off ecosystem instances 201. This configuration may by an entity, such as a database object or other like data structure, that encapsulates information used by the cloud 200A to perform the spin-off and tenant migration processes. This configuration may be a collection or set of spin-off and/or migration parameters (or "components") against which various metrics are checked. The configuration may be in any suitable format, such as HTML, XML, JSON, or some other suitable format. Additionally, a GUI may be built to allow the owner/operator/developers of a multi-tenant system to define the configuration.

Figure 3B:
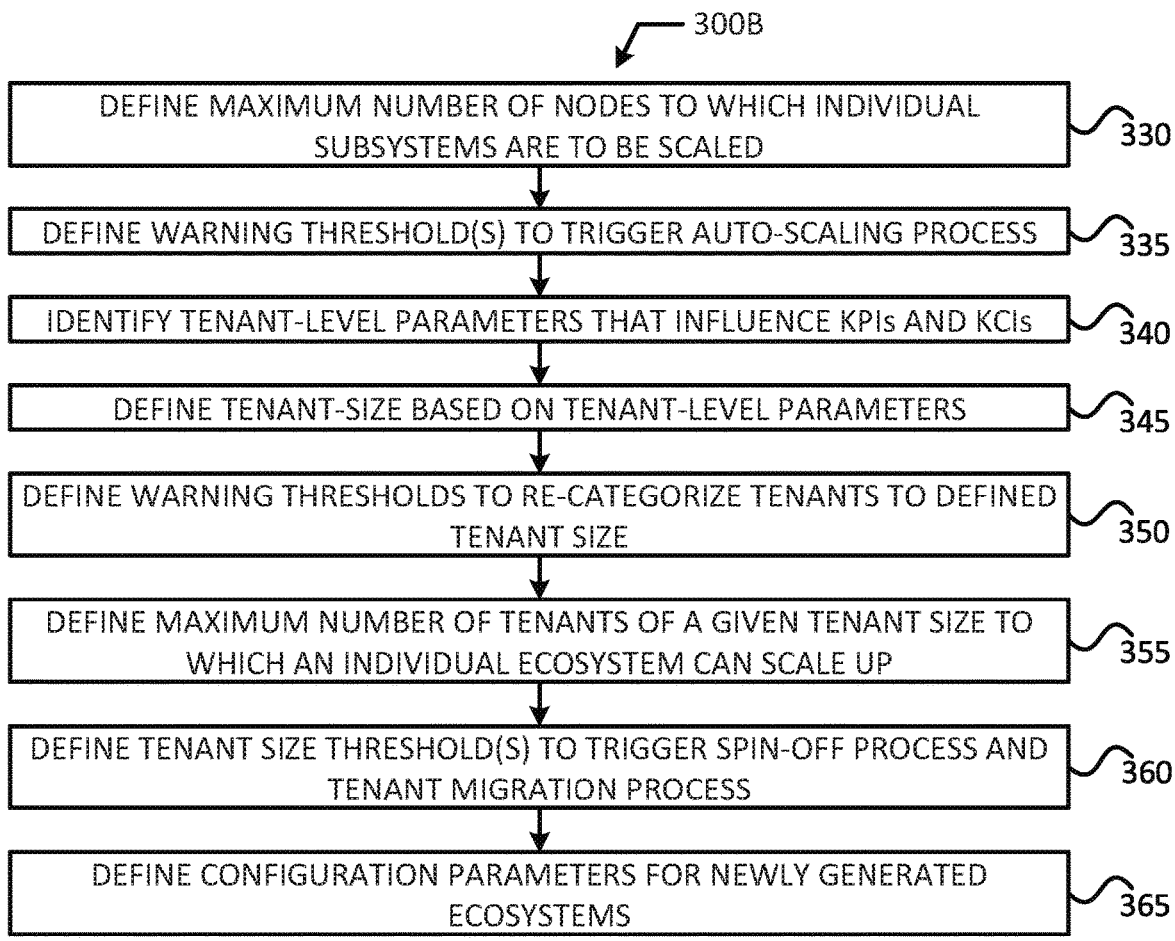
FIG. 3B shows a proactive tenant monitoring and migration configuration process, in accordance with various embodiments.

FIG. 3B shows a proactive tenant monitoring and migration configuration process 300B, in accordance with various embodiments. Process 300B may begin at operation 330 where the processing device(s) may define a maximum number of nodes to which individual subsystems (or tiers) are to be scaled. In embodiments, the upper bounds of a number of nodes that a subsystem/tier or ecosystem 201 may be scaled-out to may be defined. The maximum number of nodes may be defined in terms of physical and/or virtual devices/components, and/or in terms of nodes for individual tiers.

At operation, 335, the processing device(s) may define one or more warning thresholds to trigger an auto-scaling process when reached. In embodiments, this warning threshold may be defined in terms of the maximum number of nodes and/or in a same or similar manner as discussed previously with regard to operation 310 of process 300A. Each ecosystem instance 201 may have different thresholds to trigger the auto-scaling process.

At operation 340, the processing device(s) may identify and/or define tenant-level parameters that influence KPIs and/or KCIs. At operation 345, the processing device(s) may define a maximum tenant-size based on the tenant-level parameters. At operation 350, the processing device(s) may define warning thresholds to re-categorize tenants to the defined tenant size. Operations 340-350 may be the same or similar to operations 315-325 discussed previously with regard to process 300A.

At operation 355, the processing device(s) may define a maximum tenant size to which an ecosystem instance 201 may scale up. In embodiments, the upper bounds of a number of tenants 215 that a subsystem/tier or ecosystem 201 may be scaled-out to are defined. The maximum number of tenants 215 may be defined in terms of the amount of resources allocated to a particular tenant 215, an amount of physical and/or virtual resources consumed by a particular tenant 215 (which may be on a tier-level basis), and/or using other like criteria.

At operation 360, the processing device(s) may define tenant size threshold(s) to trigger a spin-off process and/or a tenant migration process. When the tenant size threshold(s) are reached, the processing device(s) may begin generating one or more new ecosystem instances 201. During the spin-off procedure, a determination may be made as to a specific size of each environment instance 201 to be spun off. The ecosystem size determination may be based on current input load characteristics and/or a current size of each tenant 215 within the current ecosystem 201. Additionally, individual ecosystem instances 201 to be generated may also have a defined maximum number of tenants 215 based on available and/or maximum resources allocated to a particular ecosystem instance 201. The maximum number of tenants and/or ecosystem sizes may be different for different ecosystem instances 201 to be generated. For example, referring to FIG. 2C, the ecosystem 201-1 may be generated to have a larger amount or resources 205-207 and/or a larger number of tenants 215 than the ecosystem 201-N.

Furthermore, in some embodiments, tenants 215 may be automatically migrated to new ecosystems 201 once the new ecosystems 201 are generated. During the tenant migration procedure, the ecosystem size and tenant sizes may be determined for each newly generated ecosystem 201, and a particular ecosystem instance 201 may be selected for a particular tenant 215 based on its tenant size. For example, referring to FIG. 2C, a first tenant having a first size may be migrated to ecosystem 201-1 and a second tenant having a second size may be migrated to ecosystem 201-N, where the first size is larger than the second size. Various load balancing mechanisms may be used to select tenants 215 to be migrated to different ecosystems 201 to achieve load balancing among the ecosystem instances 201.

At operation 465, the processing device(s) of the manager node may define configuration parameters for newly generated ecosystem instances 201. The configuration parameters may include assigning new network addresses (e.g., IP addresses), host names, domain names, server/machine names, etc.; updating various routing tables; and/or other like parameters.

Figure 4:
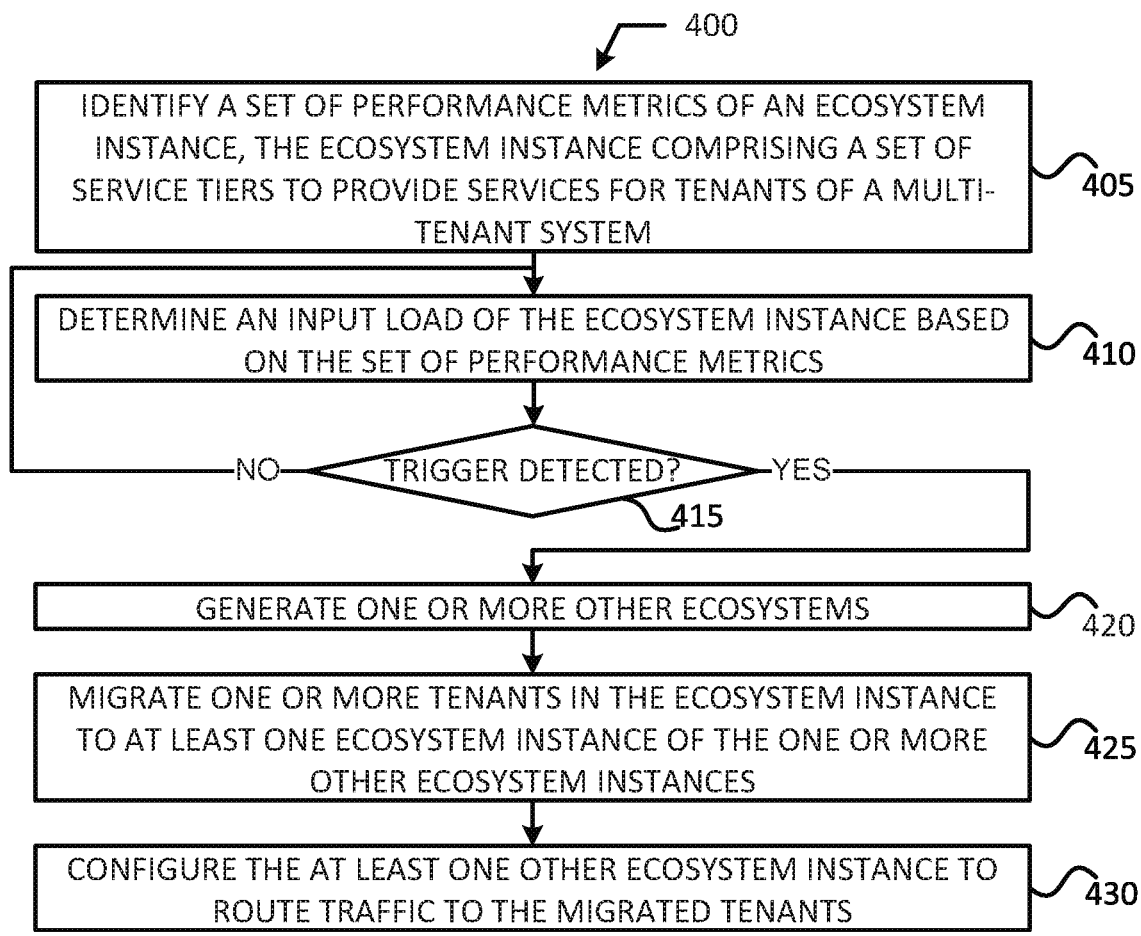
FIG. 4 shows an example spin-off and migration process in accordance with various embodiments.

FIG. 4 illustrates a spin-off and proactive tenant migration process 400, in accordance with various embodiments. Process 400 may begin at operation 405 where processing device(s) of a manager node may identify a set of performance metrics of an ecosystem instance 201, where the ecosystem instance 201 may comprise a set of service tiers to provide services for tenants of a multi-tenant system. As an example, the service tiers may include the LB tier 211, the app tier 212, and the DB tier 213 discussed previously with regard to FIGS. 2B-2C.

At operation 410, the processing device(s) may determine an input load of the ecosystem instance 201 based on the set of performance metrics. The identification of the input load may be based on the input load indicators defined using one of processes 300A-B of FIG. 3. At operation 415, the processing device(s) of the manager node may determine whether a trigger has been detected. In embodiments, the trigger may be detected upon the occurrence of an event, such as reaching or breaching one of the defined warning thresholds discussed previously with regard to processes 300A-B of FIG. 3.

The processing device(s) may determine whether the thresholds have been reached or breached based on the performance metrics identified at operation 405 and/or the input load characteristics determined at operation 410. In one example, the processing device(s) may determine whether the thresholds have been reached or breached based on a comparison of the determined input load with the defined maximum values. In another example, the processing device(s) of the manager node may determine whether the thresholds have been reached or breached based one the tenant-level parameters discussed previously. In other embodiments, other methods or mechanisms may be used for monitoring the input load characteristics and determining the threshold breaches.

If at operation 420 the processing device(s) determine that a trigger has not been detected, the processing device(s) may loop back to determine the input load characteristics at operation 410. If at operation 415 the processing device(s) determine that a trigger has been detected, the processing device(s) may proceed to operation 420 to generate one or more other ecosystem instances 201. The generating the one or more other ecosystem instances 201 may be referred to as spinning-off the ecosystem instance 201 or the like. At operation 425, the processing device(s) may migrate one or more tenants 215 from the ecosystem instance 201 to at least one other ecosystem instance 201 of the one or more other ecosystem instances 201, which were generated at operation 420. At operation 430, the processing device(s) may configure the at least one other ecosystem instance 201 to route traffic to the migrated tenants 215. After performance of operation 530, process 400 may end or repeat as necessary.

Figure 5:
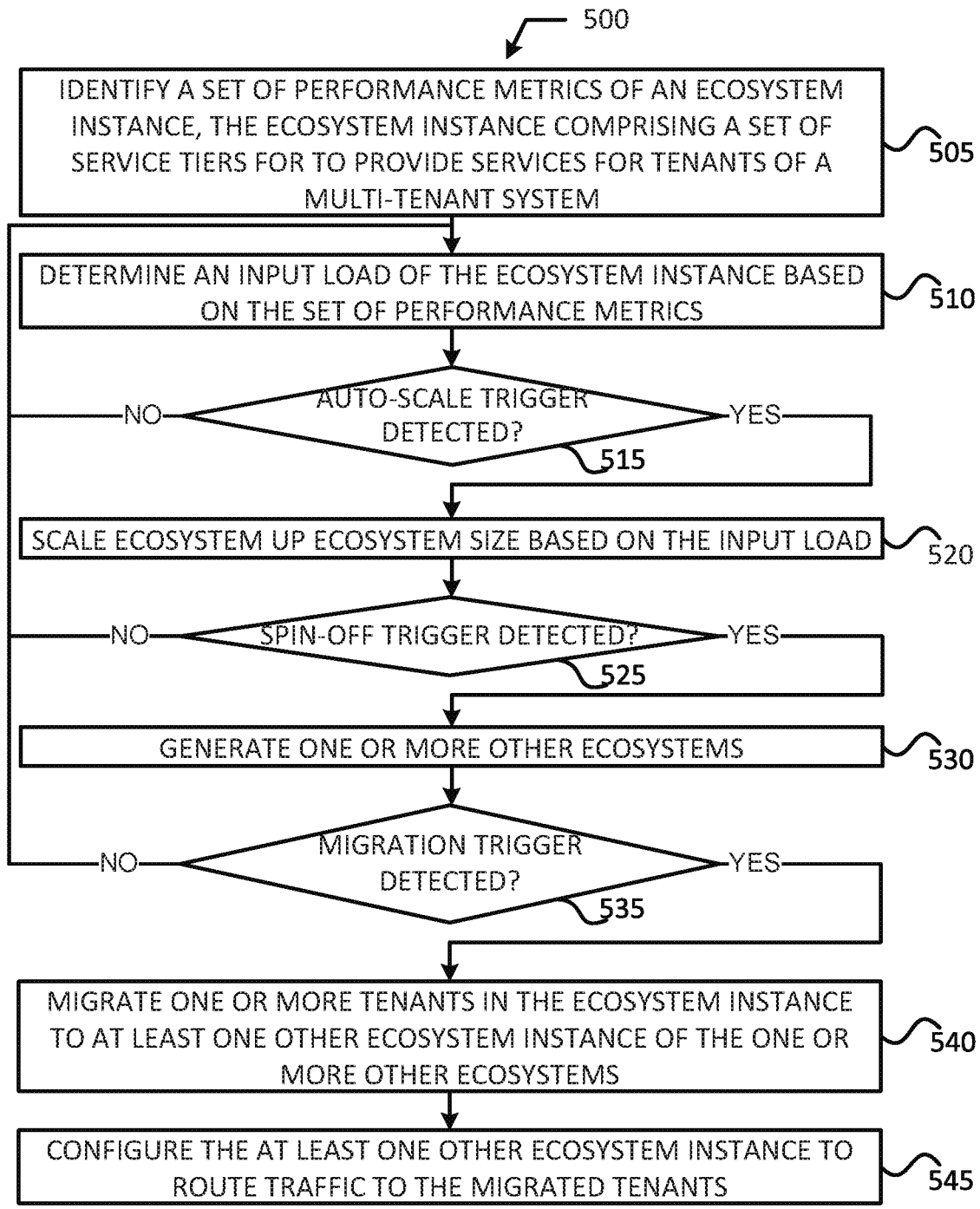
FIG. 5 shows another example spin-off and migration process in accordance with various embodiments.

FIG. 5 illustrates another spin-off and proactive tenant migration process 500, in accordance with various embodiments. Process 500 may begin at operation 505 where processing device(s) of a manager node may identify a set of performance metrics of an ecosystem instance 201, where the ecosystem instance 201 may comprise a set of service tiers to provide services for tenants of a multi-tenant system. As an example, the service tiers may include the LB tier 211, the app tier 212, and the DB tier 213 discussed previously with regard to FIGS. 2B-2C. At operation 510, the processing device(s) of the manager node may determine an input load of the ecosystem instance 201 based on the set of performance metrics in a same or similar manner as discussed previously with regard to operation 410 of process 400.

At operation 515, the processing device(s) of the manager node may determine whether an auto-scale trigger has been detected. In embodiments, the auto-scale trigger may be detected upon the occurrence of reaching or breaching a low warning threshold as discussed previously, and may be used to trigger an ecosystem auto-scaling process. The processing device(s) may determine whether the low warning threshold has been reached or breached based on the input load determined at operation 510 and/or the performance metrics identified at operation 505. If at operation 515 the processing device(s) determine that the auto-scale trigger has not been detected, the processing device(s) may loop back to perform operation 510 to determine the input load of the ecosystem instance 201. If at operation 515 the processing device(s) determine that the auto-scale trigger has been detected, the processing device(s) may proceed to operation 520 to scale an ecosystem size of the ecosystem instance 201 based on an input load.

At operation 525, the processing device(s) of the manager node may determine whether a spin-off trigger has been detected. In embodiments, the spin-off trigger may be detected upon the occurrence of reaching or breaching a medium warning threshold as discussed previously, and may be used to trigger an ecosystem spin-off process. The processing device(s) may determine whether the medium warning threshold has been reached or breached based on the input load determined at operation 510 and/or the performance metrics identified at operation 505. If at operation 525 the processing device(s) determine that the spin-off trigger has not been detected, the processing device(s) may loop back to perform operation 510 to determine the input load of the ecosystem instance 201. If at operation 525 the processing device(s) determine that the spin-off trigger has been detected, the processing device(s) may proceed to operation 530 to generate one or more other ecosystem instances 201, which may be based on the input load.

Generating the one or more other ecosystem instances 201 may be referred to as spinning-off the ecosystem instance 201 or the like.

At operation 535, the processing device(s) of the manager node may determine whether a tenant migration trigger has been detected. In embodiments, the tenant migration trigger may be detected upon the occurrence of reaching or breaching a high warning threshold as discussed previously, and may be used to trigger an tenant migration process. The processing device(s) may determine whether the high warning threshold has been reached or breached based on the input load determined at operation 510 and/or the performance metrics identified at operation 505. If at operation 535 the processing device(s) determine that the tenant migration trigger has not been detected, the processing device(s) may loop back to perform operation 510 to determine the input load of the ecosystem instance 201. If at operation 535 the processing device(s) determine that the tenant migration trigger has been detected, the processing device(s) of the manager node may proceed to operation 540 to generate one or more other ecosystem instances 201 migrate one or more tenants 215 from the ecosystem instance 201 to at least one other ecosystem instance 201 of the one or more other ecosystem instances 201, which were generated at operation 530. At operation 545, the processing device(s) of the manager node may configure the at least one other ecosystem instance 201 to route traffic to the migrated tenants 215. After performance of operation 545, process 500 may end or repeat as necessary.

The specific details of the specific aspects of implementations disclosed herein may be combined in any suitable manner without departing from the spirit and scope of the disclosed implementations. Elements and features discussed in any of the previously discussed example embodiments may be used anywhere in one or more other embodiments unless explicitly stated otherwise. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. As an example, one or more general purpose processing device(s) may be transformed into a special purpose processor configured to perform any of operations described herein responsive to accessing instructions stored in an electronic memory or computer-readable media. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer readable media (NTCRM) comprising instructions, wherein execution of the instructions by one or more processors of a master node of a plurality of compute nodes is operable to cause the master node to:

identify a set of performance metrics of an ecosystem instance of a set of ecosystem instances in which one or more tenants in a multi-tenant system (MTS) reside, each ecosystem instance of the set of ecosystem instances comprising a set of service tiers to provide services for a discrete subset of tenants in the MTS, each set of service tiers being isolated from other sets of service tiers of other ecosystem instances, the set of ecosystem instances being operated by a plurality of secondary nodes among the plurality of compute nodes;

determine an input load of the identified ecosystem instance based on the set of performance metrics;

detect a trigger for generating one or more other ecosystem instances based on the input load;

generate, in response to detection of the trigger, one or more other ecosystem instances based on the performance metrics, each of the one or more other ecosystem instances to include individual service tier sets that are isolated from one another and from the service tiers of the ecosystem instance; and migrate at least one tenant of the discrete subset of tenants from the ecosystem instance to another ecosystem instance of the one or more other ecosystem instances, and a service tier set of the other ecosystem instance is to provide services to the at least one tenant.

2. The one or more NTCRM of claim 1, wherein each of the set of service tiers and the individual service tier sets comprise an application tier, a database tier, and a load balancing tier.

3. The one or more NTCRM of claim 1, wherein the performance metrics of the ecosystem instance comprise key performance indicators (KPIs) and key capacity indicators (KCIs) for each tier of the set of tiers, and the trigger is a threshold input load that is based on a combination of the KPIs and the KCIs of one or more tiers of the set of tiers, and execution of the instructions is operable to cause the master node to:

measure component level metrics, system level metrics, and business level metrics;

correlate the KPIs and the KCIs with the measured component level metrics, system level metrics, and business level metrics; and identify tenant level parameters that influence the KPIs and the KCIs of each tier of the set of tiers based on the correlation.

4. The one or more NTCRM of claim 3, wherein the trigger comprises a first trigger and a second trigger, the first trigger being a threshold input load that is lower than a threshold input load of the second trigger, and execution of the instructions is operable to cause the multi-tenant system to:

generate the one or more other ecosystem instances in response to detection of the first trigger; and migrate the at least one tenant to the other ecosystem instance of the one or more other ecosystem instances in response to detection of the second trigger.

5. The one or more NTCRM of claim 3, wherein execution of the instructions is operable to cause the master node to:

identify tenant level parameters that influence the KPIs and the KCIs of each tier of the set of tiers; and select the at least one tenant for migration to the other ecosystem instance based on the identified tenant level parameters associated with the at least one tenant.

6. The one or more NTCRM of claim 5, wherein execution of the instructions is operable to cause the master node to:

determine a tenant size of the at least one tenant based on the identified tenant level parameters associated with the at least one tenant;

determine, based on the tenant size, a first trigger and a second trigger for the at least one tenant, the first trigger being a threshold input load generated by the at least one tenant that is lower than a threshold input load generated by the at least one tenant of the second trigger;

generate the other ecosystem instance for the at least one tenant in response to detection of the first trigger; and migrate the at least one tenant to the other ecosystem instance in response to detection of the second trigger.

7. The one or more NTCRM of claim 1, wherein, to generate the one or more other ecosystem instances, execution of the instructions is operable to cause the master node to:

determine a maximum number of tenants of the discrete set of tenants that can be migrated to each of the one or more other ecosystem instances; and determine individual triggers for each other ecosystem instance of the one or more other ecosystem instances to be generated based on the maximum number of tenants for each other ecosystem instance, the individual triggers to indicate a threshold input load for generating one or more additional ecosystem instances from an ecosystem instance in which the trigger is triggered.

8. The one or more NTCRM of claim 1, wherein execution of the instructions is operable to cause the master node to:

configure the other ecosystem instance after the at least one tenant has been migrated to the other ecosystem instance such that traffic is migrated to the other ecosystem instance for consumption by the at least one tenant.

9. A multi-tenant system (MTS) to provide cloud computing services, the multi-tenant system comprising:

a plurality of server computing systems to be employed as a plurality of compute nodes, each of the plurality of servers including at least one processor and memory, the plurality of compute nodes comprising a manager node and a plurality of secondary nodes;

the plurality of secondary nodes are configurable to:

operate a set of ecosystem instances in which one or more tenants of the multi-tenant system reside, each ecosystem instance of the set of ecosystem instances comprises a set of service tiers to provide corresponding services to the one or more tenants, and each set of service tiers are isolated from other sets of service tiers of the set of ecosystem instances; and the manager node is configurable to manage the set of ecosystem instances, and, to manage the set of ecosystems, the manager node is to:

identify a set of performance metrics of an ecosystem instance of the set of ecosystem instances, determine an input load of the ecosystem instance based on the set of performance metrics, detect a trigger for generating one or more other ecosystem instances based on the input load, initiate generation of one or more other ecosystem instances of the set of ecosystem instances in response to detection of the trigger, and migrate at least one tenant from the ecosystem instance to the one or more other ecosystem instances.

10. The MTS of claim 9, wherein each of the set of service tiers and the individual service tier sets comprise an application tier, a database tier, and a load balancing tier.

11. The MTS of claim 9, wherein the performance metrics of the ecosystem instance comprise key performance indicators (KPIs) and key capacity indicators (KCIs) for each tier of the set of tiers, and the trigger is a threshold input load that is based on a combination of the KPIs and the KCIs of one or more tiers of the set of tiers, and the manager node is further configurable to:

measure component level metrics, system level metrics, and business level metrics;

correlate the KPIs and the KCIs with the measured component level metrics, system level metrics, and business level metrics; and identify tenant level parameters that influence the KPIs and the KCIs of each tier of the set of tiers based on the correlation.

12. The MTS of claim 11, wherein the trigger comprises a low warning threshold and a high warning threshold, the low warning threshold being a threshold input load that has a lower value than a threshold input load of the high warning threshold, and the manager node is further configurable to:

generate the one or more other ecosystem instances when the low warning threshold is reached; and migrate the at least one tenant to the one or more other ecosystem instances when the high warning threshold is reached.

13. The MTS of claim 11, wherein the trigger comprises a low warning threshold and a high warning threshold, the low warning threshold being a threshold input load that has a lower value than a threshold input load of the high warning threshold, and the manager node is further configurable to:

adjust a size of the ecosystem instance when the low warning threshold is reached;

generate the one or more other ecosystem instances when the high warning threshold is reached; and migrate the at least one tenant to the one or more other ecosystem instances after the one or more other ecosystem instances are generated.

14. The MTS of claim 11, wherein the manager node is further configurable to:

identify tenant level parameters that influence the KPIs and the KCIs of each tier of the set of tiers; and select the tenant for migration to the other ecosystem instance based on identified tenant level parameters associated with the tenant.

15. The MTS of claim 14, wherein the manager node is further configurable to:

determine a tenant size of the tenant based on the identified tenant level parameters associated with the tenant;

determine, based on the tenant size, a first trigger and a second trigger for the tenant, the first trigger being a threshold input load generated by the tenant that is lower than a threshold input load generated by the tenant of the second trigger;

generate the other ecosystem instance for the tenant in response to detection of the first trigger; and migrate the tenant to the other ecosystem instance in response to detection of the second trigger.

16. The MTS of claim 9, wherein, to generate the one or more other ecosystem instances, the manager node is further configurable to:

determine a maximum number of tenants that can be migrated to each of the one or more other ecosystem instances; and determine individual triggers for each other ecosystem instance of the one or more other ecosystem instances to be generated based on the maximum number of tenants for each other ecosystem instance, the individual triggers to indicate a threshold input load for generating one or more additional ecosystem instances from an ecosystem instance in which the trigger is triggered.

17. The MTS of claim 9, wherein the manager node is further configurable to:

configure the other ecosystem instance after the tenant has been migrated to the other ecosystem instance such that traffic is migrated to the other ecosystem instance for consumption by the tenant.

18. The MTS of claim 9, further comprising:

virtualization infrastructure on which the plurality of compute nodes are to operate, and the virtualization infrastructure is configurable to generate and provide a plurality of virtualized resources for consumption by the set of service tiers and the one or more tenants.

19. A method to be performed by a manager node of a plurality of compute nodes, the method comprising:

monitoring, by the manager node, a set of performance metrics of an ecosystem instance, the ecosystem instance comprising a set of service tiers to provide services for tenants of a multi-tenant system;

determining, by the manager node, an input load of the ecosystem instance based on the monitored set of performance metrics;

adjusting, by the manager node, a size of the ecosystem instance when the input load reaches an auto-scaling threshold;

generating, by the manager node, one or more other ecosystem instances when a spin-off threshold is reached, each of the one or more other ecosystem instances to include individual service tier sets that are isolated from one another and from the service tiers of the ecosystem instance;

migrate one or more tenants residing in the ecosystem instance to the one or more other ecosystem instances; and configure the one or more other ecosystem instances after the migrating such that traffic is routed to the one or more other ecosystem instances for consumption by corresponding ones of the one or more tenants.

20. The method of claim 19, further comprising:

detecting, by the manager node, a migration trigger based on the input load; and migrating the one or more tenants in response to detection of the migration trigger.

* * * * *